Aug. 9, 1949.　　　F. D. WILLIAMS, JR　　　2,478,798
PRIMARY CELL VENT AND METHOD OF MAKING
Filed June 25, 1946
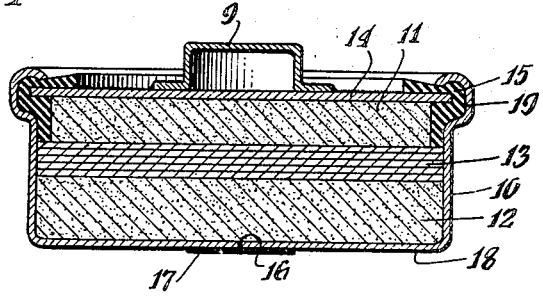
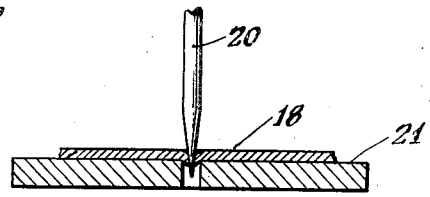
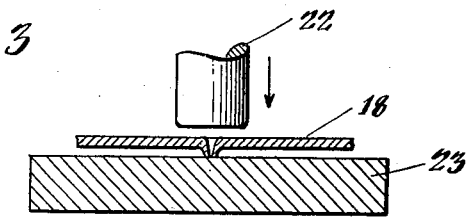
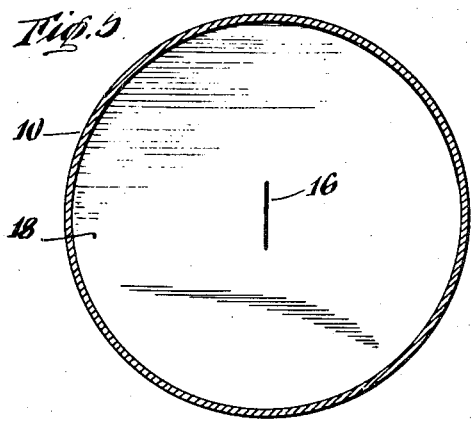
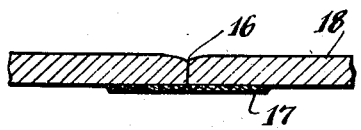
INVENTOR
Fred D. Williams, Jr.
BY
ATTORNEY Patented Aug. 9, 1949

2,478,798

UNITED STATES PATENT OFFICE 2,478,798

PRIMARY CELL VENT AND METHOD OF MAKING

Fred D. Williams, Jr., New Rochelle, N. Y., assignor to Samuel Ruben, New Rochelle, N. Y.

Application June 25, 1946, Serial No. 679,117

8 Claims. (Cl. 136—178)

This invention relates to electric primary cells and venting means therefor.

An object of the invention is to improve primary cells and pressure release vents therefor.

The invention has its principal application to primary cells which are sealed to prevent fluid leakage or evaporation during shelf life and normal use. In the ordinary uneventful operation of such cells venting is unnecessary. However, it is often desirable to provide an emergency vent therein to relieve excessive pressures, should they develop due to gas generation resulting from the presence of unusual impurities, or as a result of excessive temperature conditions. Some gas may also be generated at the end of cell life due to the depletion of the depolarizer before the anode material is fully consumed. The present invention contemplates an effective and economical emergency vent construction for a primary cell. In its preferred embodiment the vent comprises a closed crack or slit in the metal wall of the cell container.

In the drawings:

Figure 1 is an axial section through a primary cell embodying features of the invention;

Figures 2 and 3 illustrate steps in the process of producing a vent in the cell wall;

Figure 4 is an enlarged section of a portion of a cell container wall showing a completed vent;

Figure 5 is a sectional view of Figure 1 showing the bottom wall of the container in top elevation; and Figure 6 is a section showing a vent with an added protective seal.

Referring to the drawing, the cell of Figure 1 comprises a metal container 10 in which are sealed the cell electrodes 11 and 12 separated by a porous spacer 13 impregnated with an electrolyte. The cell is closed by a metal top disc 14 sealed in the mouth of container 10 by insulating grommet 15. Top 14 is provided with a terminal 9. In one embodiment of the invention the electrode 11 may be formed of zinc, the electrode 12 may comprise a mass of depolarizing material and container 10 may be formed of steel.

The container 10 is provided with an emergency vent 16 which comprises a closed slit in the center of the bottom wall 18 of the container. The slit is covered with a spot of lacquer 17 on the outside of the container for further protection.

The slit 16 functions as an emergency vent if gas pressure develops within the cell during shelf life or in use, due to impurities in the materials used, improper storage conditions, or other causes. If gas is generated the internal pressure bulges the bottom wall 18 slightly and opens slit 16 sufficiently to permit escape of liquid or gas from the container. The slit also releases any gas pressure generated at the end of cell life after the depolarizer has become depleted.

It is contemplated that, if desired, the cell may be enclosed in an outer receptacle or sheath which will receive any liquids escaping from vent 16. In other cases, several cells may be connected as a battery and be enclosed in a common outer casing which will receive any escaping liquids if venting should occur.

Figures 2 and 3 illustrate steps in the preferred method of forming the vent in the bottom wall 18 of the container. The wall is first pierced with a chisel-like tool 20 while it rests on an apertured plate 21, as shown in Figure 2. The narrow open slit produced by this operation is then closed by placing on an anvil or base plate 23 and striking the metal surface with a stamping or forging tool 22 as shown in Figure 3.

The resulting closed slit 16 in bottom wall 18 of container 10 forms a tight joint due to the plastic deformation of the metal, as is illustrated in Figures 4 and 5. If desired, as an added precaution, a spot 17 of any suitable lacquer may be applied over the slit on the outside of the container, as shown in Figure 6. This lacquer may alternatively be applied inside the container. A nitrocellulose lacquer can be used. It is obvious that this lacquer layer will break when the vent is opened by pressure.

While the vent has been illustrated as applied to the bottom wall of the cell container it is obvious that it may be applied to the side or top or other enclosing walls of the cell and that it may or may not be overlaid by an electrode layer.

What is claimed is:

1. An electric current producing cell comprising a sealed container, and cell elements and electrolyte therein, a metal wall of said cell having a split therein of limited length closed by the abutting metal of said wall and capable of opening responsive to internal pressure, and a spot of sealing lacquer coating said wall in the area surrounding and overlying said split.

2. An electric current producing cell comprising a closed container, and cell elements and electrolyte therein, and normally sealed venting means comprising a metal wall of said cell having a crevice extending therethrough from one face to the other therof, the metal of said wall defining said crevice being in tightly abutting engagement to close said crevice, said crevice being adapted to open responsive to internal pressure, and a layer of sealing lacquer coating said wall and overlying said crevice.

3. An electric current producing cell comprising a sealed container, and cell elements and electrolyte therein, a metal wall of said cell having a slit of limited length therein closed by the metal-to-metal contact of the surfaces defining said slit, said slit being capable of opening responsive to excessive internal pressure and to remain open after releasing such pressure.

4. An electric current producing cell comprising a closed container, and cell elements and electrolyte therein, and normally sealed emergency venting means comprising a metal wall of said cell having a slit extending therethrough from one face to the other thereof, the surfaces of said wall defining said slit being in direct metal-to-metal contact and in fluid-tight engagement to close said slit, said slit being adapted to open responsive to excessive internal pressure and to remain open after releasing such pressure.

5. An electric current producing cell comprising a sealed container and cell elements and electrolyte therein, a part of said container consisting of a metal wall having a weakened section therein comprising a pierced-through slit, said slit being closed by the metal-to-metal contact of the surfaces defining said slit so as to normally prevent leakage of electrolyte therethrough, but being adapted to open if excess pressure is developed in said cell and to thereby permit escape of liquid or gas from the container.

6. The method of providing venting means in fluid-tightly sealed electric current producing cells the enclosure of which includes a metal wall, which comprises piercing said wall along a line to form therein a narrow open slit, and then applying pressure upon said wall in the region of said slit to return the surfaces defining said slit into fluid-tightly sealing contacting position.

7. In the art of making fluid-tightly sealed electric current producing cells the enclosure of which includes a metal wall, the method of providing an emergency vent for the cell responsive to excessive internal pressure, which comprises the steps of piercing the metal wall of the cell along a line to displace portions of said wall at both sides of said line from the original plane of the wall thereby defining a narrow open slit, and then applying pressure upon said wall in the region of said slit to substantially return said displaced portions of the wall into their original position in which the surfaces defining said slit are in fluid-tightly sealing contacting position.

8. In the art of making fluid-tightly sealed electric current producing cells the enclosure of which includes a metal wall, the method of providing an emergency vent for the cell responsive to excessive internal pressure, which comprises the steps of placing said wall on a base having an aperture in its surface, applying piercing pressure to said wall along a line above the aperture in said base to displace portions of said wall at both sides of said line from the original plane of the wall thereby defining a narrow open slit, placing said wall upon another base having a continuous surface, and then striking said wall in the region of said slit to substantially return said displaced portions of the wall into their original position in which the surfaces defining said slit are in fluid-tightly sealing contacting position.

FRED D. WILLIAMS, Jr.

REFERENCES CITED

The following references are of record in the file of this patent:

UNITED STATES PATENTS

| Number | Name | Date |
|---|---|---|
| 741,675 | Dickson | Oct. 20, 1903 |
| 1,366,298 | Teitlebaum | Jan. 18, 1921 |
| 1,428,399 | Schilling | Sept. 5, 1922 |
| 1,732,158 | Ford | Oct. 15, 1929 |
| 1,865,764 | Keenan | July 5, 1932 |
| 2,203,797 | Pearson | June 11, 1940 |
| 2,235,101 | Enkur | Mar. 18, 1941 |

FOREIGN PATENTS

| Number | Country | Date |
|---|---|---|
| 379,502 | Great Britain | Sept. 1, 1932 |
| 648,257 | France | Aug. 13, 1928 |